Nov. 25, 1952           N. L. SCHMITZ           2,619,629
LOW-FREQUENCY GENERATOR
Filed April 27, 1946
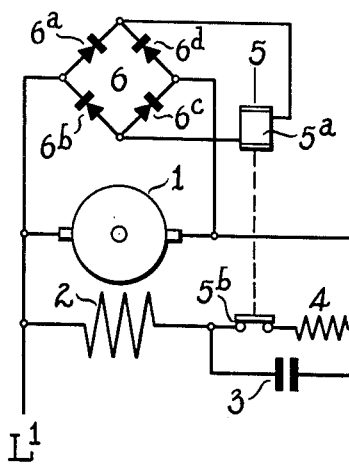
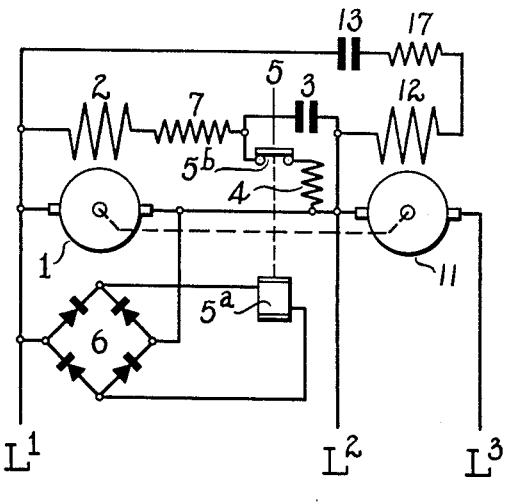
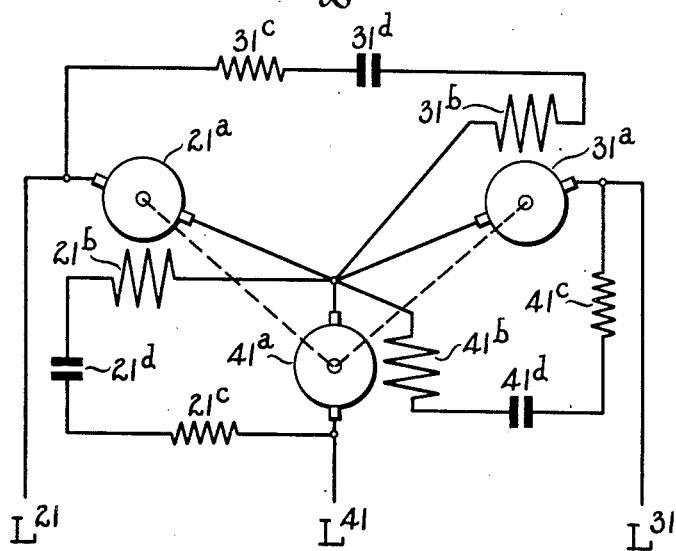
Inventor
Norbert L. Schmitz
By ⸺
Attorney Patented Nov. 25, 1952

2,619,629

UNITED STATES PATENT OFFICE 2,619,629

LOW-FREQUENCY GENERATOR

Norbert L. Schmitz, Milwaukee, Wis., assignor to Cutler-Hammer, Inc., Milwaukee, Wis., a corporation of Delaware Application April 27, 1946, Serial No. 665,369

8 Claims. (Cl. 322—28)

The invention relates to systems for the generation of alternating single or polyphase currents of low frequency and is particularly suited to the generation of frequencies below those generally supplied by conventional power generating equipment.

In the operation of printing presses and the like by induction motors it is necessary upon starting to overcome the very high resistance of rest and thereafter to rotate the presses at a very low speed at a low torque. To accomplish this the conventional systems employing induction motors supplied with power from an alternating current source require the interposition of complicated commutatable speed reducing driving means between the motor and press.

The present invention has for its object to provide for starting and slow speed a supply of supplemental low frequency power for the induction motors which drive the press or the like, said supplemental power supply being connected to the press motors during starting and inching.

Another object is to provide a system comprising a self-exciting generator for delivering alternating current of relatively low frequency.

Another object is to provide an alternating current generator having an alternating current excitation circuit, the frequency of which may be adjusted for adjustment of the frequency of the output current of the machine.

Another object is to provide a system comprising a plurality of generators which may be mechanically and electrically coupled to provide multi-phase current of relatively low frequency.

Another object is to provide a generating system of the aforementioned kind which is small in relation to its capacity.

Another object is to provide a generator of the aforementioned kind which is simple in construction and operation.

Other objects and advantages will hereinafter appear.

The accompanying drawings are illustrative of several embodiments of the invention.

In the drawings,

Figure 1 is a diagrammatic showing of a single-phase generating system embodying the invention.

Fig. 2 is a diagram of a two-phase system, while

Fig. 3 is a diagram of a three-phase system.

Referring to Fig. 1, the same illustrates a shunt-excited generator having a commutator type armature which may be driven by any suitable prime mover, such as an induction motor (not shown). The generator comprises a continuously wound armature having a conventional commutator 1, and a field winding 2. The commutator 1 is connected to bus bars $L^1$ and $L^2$. The field winding 2 is connected in series with a capacitor 3 in a circuit between the lines $L^1$ and $L^2$ and thus paralleling the armature commutator 1. Connected in parallel with the capacitor 3 is a current limiting resistor 4 in series with normally closed contacts $5^b$ of an electromagnetic relay 5 having an energizing winding $5^a$. The energizing winding $5^a$ is connected across the output terminals of a bridge-connected full-wave rectifier 6, comprising the rectifier elements $6^a$, $6^b$, $6^c$ and $6^d$. The input terminals of the rectifier 6 are connected to the bus bars $L^1$, $L^2$, respectively.

The operation of the system is as follows: When the armature 1 begins to rotate upon starting of the driving motor the residual magnetic flux of the field frame generates a voltage in the armature which in turn causes a flow of energizing current to pass through the field winding 2, the contacts $5^b$ and limiting resistor 4, thereby strengthening the field flux and thus cumulatively increasing the generated armature voltage. A current also flows through the rectifier 6 and the energizing winding $5^a$ of relay 5, while the capacitor 3 is substantially short-circuited by the contacts $5^b$ and limiting resistor 4. When the armature voltage has reached a certain value the relay winding $5^a$ is sufficiently energized to cause the opening of the contacts $5^b$, thereby interrupting the flow of field current through the resistor 4. However, field current continues to flow through the field winding into the capacitor 3 to charge the same. As the charge of the capacitor and thus its voltage increases, the charging current and thus the current through the field winding 2 decrease, which in turn now causes a decrease of the voltage induced in the armature, thus further reducing the voltage applied to the field winding and the charging current flowing into the capacitor. When the voltage generated in the armature is equal to the sum of the induced electromotive force of the field winding 2 and the charging voltage of the capacitor, current flow through the field winding ceases. As a result, the voltage induced in the armature 1 continues to decrease so that the voltage of the capacitor becomes gradually higher than the voltage of the armature and so that the capacitor discharges through the field winding, thereby reversing the direction of the electromotive force induced in the armature. This continues until the voltage of the armature is sufficiently high to again charge the capacitor but now with a potential which is the reverse of that of the first charge. As the capacitor potential again increases, its rate of charge decreases, and as a result the field current decreases. This, in turn, decreases the resulting voltage generated in the armature 1 until the latter again passes through zero to start a new cycle of current flow in the original direction. It will thus be seen that the generator is capable of supplying an alternating voltage, the frequency of which depends substantially upon the relative capacitance of the capacitor 3 and the inductance of the field winding 2. If a load, such as an induction motor is connected to the bus bars $L^1$, $L^2$, the armature will supply an alternating current thereto, as will be apparent.

Upon disconnecting the prime mover to shut down the generator, the speed of the generator armature declines, and the magnitude of the alternating voltage across $L^1$ and $L^2$ decreases. Were this allowed to continue, the generator field would be demagnetized and the residual flux would be insufficient for restarting the system. Relay 5 prevents this condition. As the alternating voltage across $L^1$ and $L^2$ declines, the current through rectifier 6 and relay coil $5^a$ decreases until at a preset minimum relay 5 drops out closing contacts $5^b$. This bypasses capacitor 3 through the current limiting resistor 4 and the voltage across $L^1$ and $L^2$ becomes unidirectional, a condition favorable to storing a residual flux in field 2.

It is well known that in order to reduce the eddy current loss in the field structure resulting from the periodic reversal of the field flux, the same should be laminated.

Armature reactance in the aforedescribed system results from the periodic reversal of the current flowing between the brushes. It is possible to reduce this armature reactance by providing a compensating field winding to provide a magnetomotive force in line with the brushes. This magnetomotive force acts through the armature in a direction opposite to that of the magnetomotive force component resulting from the current in the armature inductors and thereby greatly reduces the flux caused by the armature current and consequently reduces the reactance of the armature to the current delivered to the brushes. The compensating winding is particularly advantageous when the generator supplies current to an external inductive load in which case the reactive voltage drop due to the load is directly opposed to, that is, 180° out of phase with the voltage generated in the armature.

It is also possible to use a field structure employing split poles, that is, a field structure in which each pole is divided into two parts by an air gap arranged parallel to the main magnetic field in the pole. As the reactive field component is at right angles to the main field the split poles do not increase the reluctance of the path of the main field but they increase the reluctance of the path of the reactive flux.

Referring now to Fig. 2, the same illustrates a system for the generation of two phase alternating current of low frequency. The system in general comprises two single phase generating systems each similar to that illustrated in Fig. 1 and described in connection therewith. To generate two currents which are displaced in phase from each other the field windings of the two parts of the system have connected in series therewith individual capacitors and resistors so proportioned as to attain a phase displacement between their exciting currents and thus between the corresponding armature currents.

The system (Fig. 2) again comprises an armature 1 with a co-ordinated filed winding 2, connected in series with a condenser 3 to the bus bars $L^1$, $L^2$. There is also inserted in series with the field winding 2 and the capacitor 3, a resistor 7, while the resistor 4 is connectable in parallel with the capacitor 3 through normally closed contacts $5^b$ of an electro-magnetic relay 5. Also connected across the terminals of the armature 1 is the rectifier 6, which supplies the winding $5^a$ with rectified current. Coupled to the armature 1 to rotate therewith is a similar second armature 11 which is connected to the bus bars $L^2$ and $L^3$. The bus bars $L^1$, $L^2$ and $L^3$ form the conductors for the polyphase current to be supplied by the system. The armature 11 has co-ordinated therewith a field winding 12, which is connected in series with a resistor 17 and a capacitor 13 across the bus bars $L^1$ and $L^2$. Both field windings 2 and 12 are thus energized from the armature 1, but the resistors 7 and 17, respectively, and the capacitors 3 and 13, respectively, are so proportioned that the currents passing from the armature 1 through the two field windings 2 and 12 are dephased relative to each other substantially 60 degrees. For this purpose the resistor 7, in series with the field winding 2, should be approximately twice the resistance of the resistor 17 in series with the field winding 12. By reversing the polarity of one of the field windings relative to its armature as compared to the other, the flux of one of the fields is reversed, so as to produce two fluxes which differ in phase 120 degrees. As a result the voltage between the bus bars $L^1$ and $L^2$, and between $L^2$ and $L^3$, respectively, are also dephased 120 degrees and can thus supply a polyphase current of low frequency which may be impressed on an induction motor to operate the latter at a low speed.

Instead of energizing the field winding 2 by a voltage derived from the armature 1 it is possible to connect the circuit containing the field winding 2, and the capacitor 3 and the resistor 7 in shunt with the armature 11 so that the field winding inductively related to the respective armature is excited from the other armature. Such possible alternative connection would be like a connection shown in Fig. 3.

Fig. 3 illustrates application of connections like the connection mentioned in the foregoing paragraph to a three-phase system comprising three armatures $21^a$, $31^a$ and $41^a$ to be coupled together and driven by a single motor (not shown). These armatures have correlated thereto field windings $21^b$, $31^b$ and $41^b$, respectively. The field winding $21^b$ which energizes armature $21^a$ is connected across the armature $41^a$ in series with a resistor $21^c$ and a capacitor $21^d$. The field winding $31^b$ which energizes armature $31^a$ is connected in series with a resistor $31^c$ and a capacitor $31^d$ in shunt with the armature $21^a$. Similarly the field winding $41^b$ which is correlated to the armature $41^a$ is connected in series with a resistor $41^c$ and a capacitor $41^d$ in shunt with the armature $31^a$. The resistors $21^c$, $31^c$ and $41^c$, and the capacitors $21^d$, $31^d$ and $41^d$, respectively, are so proportioned that they induce voltages in the correlated armatures $21^a$, $31^a$ and $41^a$ which are 120 degrees out of phase relative to each other so that a three-phase voltage appears at the bus bars $L^{21}$, $L^{31}$ and $L^{41}$, respectively connected to armatures $21^a$, $31^a$ and $41^a$. The operation of the system will be apparent from the explanations given in connection with the systems shown in Figs. 1 and 2. Also it will be apparent that instead of three generators supplying a low frequency three-phase current a greater number of generators for a greater number of phases with corresponding phase differences between the voltages of the different phases may be employed.

I claim:

1. In combination, a commutator type dynamoelectric generator, means to connect a field winding of said generator in circuit with the armature of said generator to initiate generation of a voltage in said armature as a function of the residual magnetism of said generator, and means including circuit commutating means operable in response to a predetermined magnitude of said voltage to afford said field winding circuit upon response of said circuit commutating means a regulable oscillatory characteristic.

2. In an alternating current generating system, in combination, a generator having a commutator type armature and an exciting field winding, means to connect said field winding in circuit with said armature to initiate generation of a voltage in said armature as a function of the residual magnetism of said generator, a capacitor, and circuit commutating means responsive to the voltage of said armature to connect said capacitor to said exciting winding to provide with the latter an oscillatory circuit for subjecting said armature to the oscillatory flux resulting from the current flowing in said oscillatory circuit.

3. In an alternating current generating system, in combination, an output circuit, a commutator type armature connected to said output circuit, an exciting winding for said armature, a capacitor, an impedance, and means controllable by the voltage of said armature selectively to connect said winding in series with said impedance across said output circuit or to connect said winding in series with said capacitor across said output circuit.

4. In a polyphase generating system, in combination, a plurality of like commutator type armatures coupled together to rotate in unison, an exciting winding, a capacitor and a resistor for each of said armatures and connections whereby one armature supplies voltage to the exciting winding of another of said armatures through the capacitor and resistor of the last mentioned winding, and means controllable by the voltage of one of said armatures normally to connect one of said armatures and an exciting winding thereof to act as a self-excited shunt generator for generation of an initial voltage and then to interrupt such connections of the last mentioned exciting winding to subject the last mentioned armature to the influence of an exciting winding supplied through the respective capacitor and resistor.

5. In a polyphase generating system, in combination, a plurality of like commutator type armatures coupled together to rotate as a unit, an exciting winding, a capacitor and a resistor for each of said armatures, means controllable by the voltage of one of said armatures selectively to connect its respective winding across said one armature in series with the respective resistor or to connect its said winding in series with the respective capacitor across said one armature, and means to connect the exciting winding and the capacitor of a second armature in series with each other across the output circuit of the first mentioned armature.

6. In combination, a self-excited, commutator type dynamoelectric machine having an exciting field winding, a capacitive reactance connected in series relation with said field winding, means providing a direct current conducting path in shunt to said capacitive reactance, whereby said dynamoelectric machine builds up as a direct current generator, and means for opening said direct current conducting path in response to the voltage generated by said dynamoelectric machine, whereby the dynamoelectric machine is converted to alternating current generation.

7. In combination, a self-excited, commutator type dynamoelectric machine having an exciting field winding, a capacitive reactance connected in series relation with said field winding, a normally closed relay having the contacts thereof connected to provide a shorting connection around said capacitive reactance, and means connecting said relay to be energized by the generated voltage of said dynamoelectric machine to open said contacts, whereby said dynamoelectric machine builds up as a direct current generator and is then converted to an alternating current generator by operation of said relay.

8. In combination, a self-excited, commutator type, dynamoelectric machine having an armature and an exciting field winding connected in shunt to said armature, a condenser connected in series relation with said exciting field winding, a normally closed relay having the contacts thereof connected to provide a shorting connection around said condenser, and means connecting said relay across said armature to be energized by the generated voltage of said dynamoelectric machine to open said contacts, whereby said dynamoelectric machine builds up as a direct current generator and is then converted to an alternating current generator by operation of said relay.

NORBERT L. SCHMITZ.

REFERENCES CITED

The following references are of record in the file of this patent:

UNITED STATES PATENTS

| Number | Name | Date |
|---|---|---|
| 1,673,598 | Slepian | June 12, 1928 |
| 2,087,326 | Marrison | July 20, 1937 |
| 2,460,714 | Roys | Feb. 1, 1949 |
| 2,539,273 | Ringland | Jan. 23, 1951 |

FOREIGN PATENTS

| Number | Country | Date |
|---|---|---|
| 408,200 | Great Britain | July 1, 1932 |
| 537,694 | Great Britain | July 2, 1941 |
| 560,180 | Great Britain | Mar. 23, 1944 |
| 697,198 | France | Oct. 21, 1930 |